Figure 1:
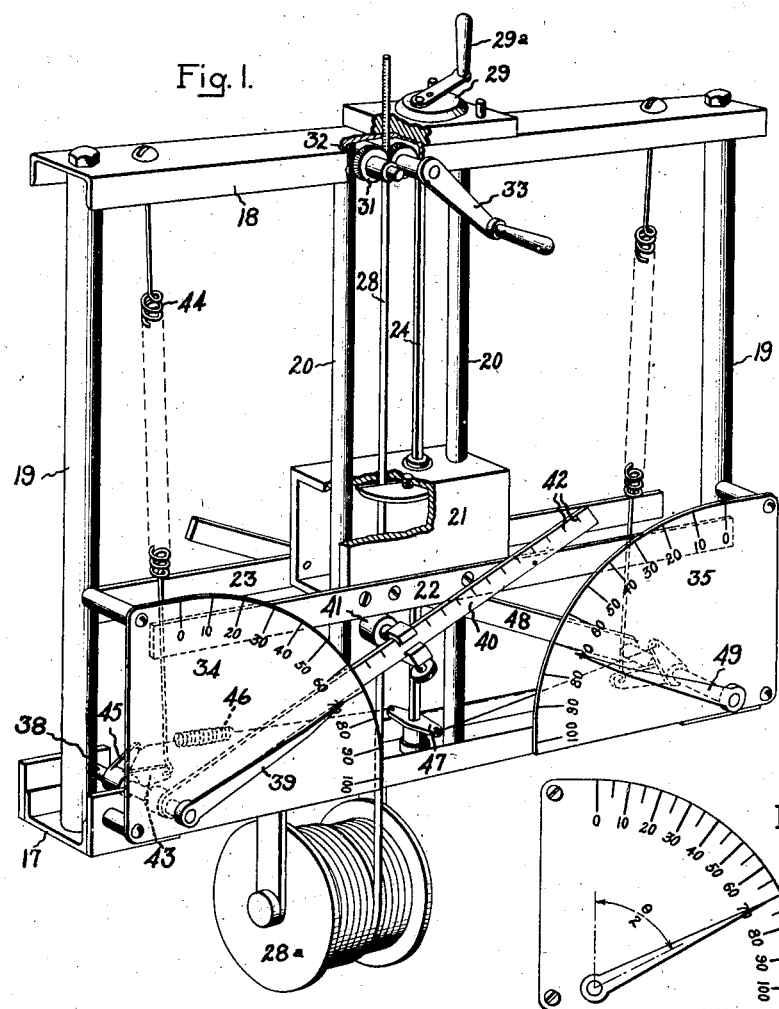

Sept. 6, 1932.  E. L. THEARLE  1,876,525

WEIGHT CALCULATING MACHINE

Filed Aug. 26, 1930

Inventor:
Ernest L. Thearle,
by Charles E. Tullar
His Attorney.

Patented Sept. 6, 1932

1,876,525

UNITED STATES PATENT OFFICE

ERNEST L. THEARLE, OF SCHENECTADY, NEW YORK, ASSIGNOR TO GENERAL ELECTRIC COMPANY, A CORPORATION OF NEW YORK

WEIGHT CALCULATING MACHINE

Application filed August 26, 1930. Serial No. 477,941.

In my application for patent, Serial Number 375,934, filed July 5, 1929, there is described and claimed a dynamic balancing machine for determining the unbalance of rotating bodies and also the location on the body where its mass requires to be changed. The body to be balanced is elastically supported at two spaced points and has means whereby first one end and then the other end of the body is freed to vibrate with two degrees of freedom while the opposite end is fixed in such a way as to afford a pivotal support at some point in the axial plane. The body is rotated by a suitable motor above its critical speed as determined by its particular mounting. In addition to the above, a balancing head is mounted on the shaft of the body for rotation therewith which contains metal spheres or balls which are free to adjust themselves in the raceway of the head to different angular positions depending upon the amount of unbalance in said body.

The amount by which the mass of the rotor should be changed in any chosen plane normal to the axis of the rotor and at any chosen radius, is proportional to the balance correction introduced by the balancing head in its plane, which is given by $$2 Wr \cosine \frac{\theta}{2}$$

where W is the weight of one ball, $r$ the radial distance from the center of each ball to the axis of rotation and $\theta$ the angle subtended by the balls. The point at which the corrective weight should be added to or removed from the rotor is determined by said chosen radius, the intersection of said chosen normal plane and an axial plane of the rotor making an angle $$\frac{\theta}{2}$$

with both balls, i. e., bisecting the angle between the balls.

In the balancing of any number of rotors of similar design and size, all moment arms, the radius $r$ of the balls and the weights of the balls remain constant. The only variable quantity determining the amount and position of the corrective weight is the angle $\theta$ between the balls. The amount of corrective weight is, therefore, always proportional to the cosine of half of this angle $\theta$, and the device herein described is designed to cut a weight which is proportional to the cosine of half the angle read on the dials of the machine.

The object of the present invention is an improved machine whereby the amount of weight which is to be added to the body being balanced can easily and quickly be determined without the use of mathematical formula, and with virtually no mental effort on the part of the operator conducting the balancing operation.

For a consideration of what I believe to be novel and my invention, attention is directed to the accompanying description and the claims appended thereto.

Figure 3:
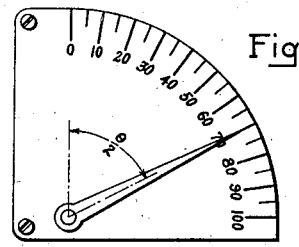
Figure 4:
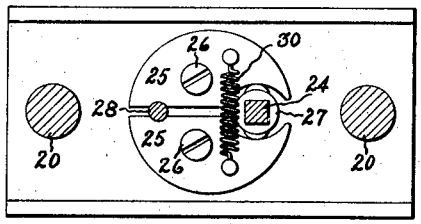
Figure 5:
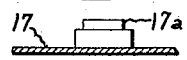
Figure 2:
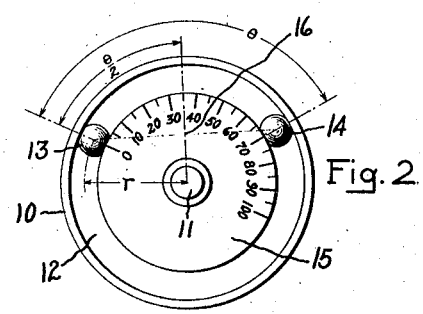

In the drawing Fig. 1 is a perspective view of a machine illustrating one of the embodiments of my invention; Fig. 2 is a view in front elevation of a balancing head such as is used with my improved balancing machine above referred to; Fig. 3 is a view in elevation of a scale plate used with the machine shown in Fig. 1; Fig. 4 is a view of the clamping means for the weight, such as solder, which is later applied to the rotor which is being balanced and Fig. 5 is a rubber cushion to absorb the shock of the cross-head when it is released and drops.

Referring first to Fig. 2 which shows the balancing head previously mentioned and ready to be read after a balancing operation. It comprises a cylindrical member 10 which is secured to the shaft 11 of the body being balanced for rotation therewith. Near the periphery of the head is a raceway 12 in which two balls 13 and 14 are free to assume different angular positions with respect to the head as determined by the unbalance of the body. For simplicity of illustration, the means employed to release the balls while the head is revolving and to clutch them in adjusted position have been omitted. A suitable adjustable scale 15 is also provided by means of which the angle defined by the balls may be determined. The scale covers 180° and is suitably divided into 100 units. Since the balls move in a circular raceway which is concentric with the axis of the shaft and head, their radius $r$ is constant. The center of gravity 16 of the balls lies at the intersection of a line passing through the centers of the balls and of an axial plane perpendicular to said line and containing the axis of the head. $\phi$ indicates the angle between the balls, and on dividing this angle equally, as indicated by $$\frac{\theta}{2},$$

the plane of division will be found to pass through the center of gravity of said balls.

Referring now particularly to Fig. 1, 17 indicates a bottom frame member, and 18 the upper frame member. These are rigidly connected by columns 19 located at the ends thereof. In the center of the frame thus described is a pair of parallel rods 20 which form vertical guides for a cross-head which comprises a hollow box-like member 21, to the front and rear walls of which are secured horizontal bars or straight edges 22 and 23.

In a machine of this character it is necessary to restore the parts to their respective initial positions between successive operations, and it is desirable to do this automatically for reasons which will be readily appreciated. One simple way to accomplish this is to employ as a means the force of gravity. To this end the cross-head and associated parts are given sufficient mass or weight in addition to that required for purely mechanical reasons so that when released they will return or drop to their normal positions which in this case is at the bottom of the frame. To absorb the shock due to the dropping of the cross-head when released from an elevated position, the bottom frame member is provided with a pair of rubber cushions 17a, located directly under the cross-head, one of which is shown in Fig. 5. Extending vertically and freely through the cross-head is a square shaft 24 for actuating a clamp for the solder or other weight material. The clamp is shown in Fig. 4 and comprises a pair of jaws 25 each having a pivot 26. They are moved to clamping position by the cam 27 which is moved up and down by the cross-head and slides on the square shaft 24. 28 indicates the solder or other weight material which is in the form of a small diameter rod and is received from the reel 28a. In the position shown the members 25 are clamping the solder. When the cam is moved by turning the square shaft in one direction the clamp is released and the spring 30, being on the opposite side of the pivots from the jaws, opens them to release the solder, after which the cross-head is free to move downwardly, in this case by the action of gravity.

On the upper end of the square shaft 24, and eccentrically mounted thereon is a cutter or knife having a handle 29a by means of which the knife and shaft are turned as well as the jaw actuating cam 27. When the handle and knife are in the non-cutting position the jaws of the clamp are closed about the solder, and when the handle and knife are moved to cut the solder the shaft 24 is turned in a direction to cause the cam 27 to release the jaws of the clamp.

Mounted on the cross bar 18 of the frame is a pair of pulling rollers 31 which have small teeth 32 on their opposed surfaces that cut into the solder 28 and form small teeth therein resembling those of a rack. These teeth ensure a firm grip on the solder or weight material to prevent slipping as it is pulled through the machine and therefore error in calculation of the weight which is represented by that portion of the solder or rod above the knife. Also they serve as a means to positively raise the cross-head or measuring means by the desired amount. One of the rollers has a handle 33 which on being turned causes the rollers to bite into the soft solder and pull it upward preparatory to a length thereof being cut off by the knife 29. The upward movement of the solder, due to the action of the rollers 31, raises the cross-head and also the straight edges 22 and 23 connected thereto.

Secured to the front face of the frame along the bottom edge thereof are two scale plates 34 and 35. One of these scales is used in determining the amount of weight to be added to one end of the rotor being balanced and the other the amount of weight to be added to the other end of said rotor.

38 indicates a rock shaft or pivot carried in suitable bearings mounted at the bottom of the frame. On the front end of the shaft is a pointer 39 which travels over the scale 34. Directly back of the scale plate and mounted on the rock-shaft and moved thereby is an arm 40 upon the free end of which is adjustably clamped a roller 41 that travels along the lower surface of the straight edge 22. The arm has suitable indicating marks 42 to enable the operator to accurately adjust the position of the roller. The roller 41 is adjustable so as to suit different rotor sizes. In general it may be stated that the greater the distance the roller is from the pivot of its supporting arm, the greater will be the length of weight material ejected by the pulling means for a given position of the pointer 39. In order that the arm 40 may automatically follow the upward movements of the cross-head or measuring means due to the rotation of the toothed rollers 31, there is mounted on the rock-shaft a short arm 43 to the end of which is connected a coiled extension spring 44. To avoid extra operations, the cross-head 21 and straight edges are arranged to immediately move or drop to the lowest or initial position where the arms 40 are horizontal, as soon as a length of solder is cut off by the knife. It may happen in the operation of the machine that the roller 41 has been moved to a position directly or nearly over the rock shaft or to a position where the effective weight of the cross-head and straight edges is not sufficient to start their downward movements. To overcome this, a short arm 45 is also mounted on the rock shaft 38 which is connected by an auxiliary spring 46 to a cross-arm 47 mounted on and turning with the square shaft 24. When the shaft 24 is turned clockwise by the handle 29a it moves the cross-arm 47 and in so doing exerts sufficient pull to turn the rock shaft or pivot 38 by a sufficient amount to move the arm 40 and roller 41 to the right to a position where the effective weight of the cross-head and associated parts is sufficient to cause it to overpower the springs 44 and 46 and permit the head and parts to drop to their lowest or initial positions.

From what has been stated above it will be seen that the cross-head forms a measuring means for determining the length of solder or weight which later is cut off by the knife 29. The amount that the measuring means is moved is indicated by the pointer 39 which in turn is actuated by the lifting spring 44, the roller 41 on the arm 40 rolling on the straight edge 22 restricts the anti-clockwise movement of the pointer to an amount governed by the movement of the measuring means. When the knife is actuated the rod of solder below it remains intact and remains clamped between the toothed rollers 31. The act of cutting the solder opens the jaws of the clamp which permits the cross-head and associated parts to drop to the bottom of the frame where said head rests on the rubber cushions 17a. It will also appear that the rod of solder in its passage through the machine is utilized to perform useful work, i. e., lifting of the cross-head, which otherwise would have to be done by a separate device. This feature is important because it has the effect of simplifying the machine.

The parts for operating the rear arm 48 and pointer 49, with respect to the scale plate 35, are duplicates of those just described and hence need no further description.

As previously indicated, from the reading of a single number on the balancing head of Fig. 2, the present machine calculates and delivers to the operator the correct amount of wire solder or weight to bring the rotor or body being balanced to a balanced condition. This relieves the operator of practically all mental effort, the possibility of error, and reduces the time required in the preparation of the correct weight to about three seconds on the average.

The operation of my improved machine with the cross-head down, the arms 40 and 48 horizontal, and the upper end of the rod of solder engaged by the rolls 31, (the normal position of said parts), is as follows: The operator notes from the balancing head that the balls are separated by say seventy units on the scale 15. He then moves the handle 29a against the back stop, which has the effect of causing the jaws 25 of the clamp to firmly grip the solder 28. The next step is to rotate the handle 33 clock-wise which causes the rollers 31 to pull the solder 28 upward and at the same time raise the cross-head which permits the spring 44 to move the arm 40 and pointer 39 upwardly until the latter registers with the indication 70, this being the same number indicated by the balancing head, and because the scale on plate 34 is only half the angular length of scale 15 on the balancing head and has the same number of units of division, 100 in this case, it gives a reading corresponding to one-half the angle $\theta$ between the balls. When the pointer 39 registers with the proper indication on the scale, the operator moves the handle 29a to the front stop, which has the effect of cutting off a piece of solder of the required length and weight to balance the rotor, as indicated by the balancing head, and at the same time permits the cross-head and other parts to drop to their normal positions at the bottom of the frame. While these operations are being carried out the rear arm 48 also moves upwardly but has no effect on the described operation.

For determining the weight to be added to the other end of the rotor, the operator follows the same procedure, first obtaining the proper reading on the balancing head, but uses scale 35, pointer 49 and arm 48, otherwise the procedure is the same. From the foregoing it will be seen that the length of travel or upward movement of the cross-head, that of the solder and of the weight of solder exposed beyond the knife are proportional to the cosine of the angle made by the pointer 39, which in turn is proportional to the cosine $$\frac{\theta}{2}.$$

Thus, when the roller 41 is properly adjusted and locked in the arm 40, the machine will permit of cutting the proper amounts of solder, as indicated by the balancing head, for any number of rotors of a given design, it being understood in this connection that although the rotors have the same design, the amount of weight to be added will be varied somewhat in each case because it rarely happens that two rotors are identical as to mass distribution or state of unbalance.

What I claim as new and desire to secure by Letters Patent of the United States, is:—

1. In a machine of the character described, the combination of a supporting frame, means carried by the frame for positively pulling a length of weight material through the machine from a source of supply, which means is in constant clamping engagement with the material, a means carried by the frame whereby a measure of the length of weight material so moved may be ascertained, a knife carried by the frame for cutting off said length of material, and means for restoring the measuring means to its initial position.

2. In a machine of the character described, the combination of a supporting frame, means carried by the frame for pulling a length of weight material through the machine from a source of supply, a member which is releasably connected to the weight material at an intermediate portion of its length and is moved by it, a pivotally supported pointer and an element which moves as a unit and by an amount governed by the movement of the member, the member, pointer and element being so related that the length of travel of the member is proportional to the cosine of the angle made by the pointer and element, and a knife for cutting off a length of weight material.

3. In a machine of the character described, the combination of a supporting frame, a pair of rollers carried by the frame for pulling a length of weight material through the machine from a source of supply, a member supported by the frame which is releasably clamped to the weight material and is moved by it, a pivotally supported pointer and a pivotally supported element which move as a unit, actuating means which cause the element and pointer to move by an amount governed by the movement of the member, and a knife for cutting the weight material after it has passed through the rollers.

4. In a machine of the character described, the combination of a frame, a measuring means mounted to move therein, means for pulling a length of weight material through the machine from a source of supply, a releasable clamp carried by the measuring means for clamping it to the weight material so as to be moved thereby, a pivoted arm, the angular movement of which is governed by the movements of the measuring means and of the weight material, and a knife for cutting off a length of weight material after it has passed through the pulling means.

5. In a machine of the character described, the combination of a frame, a cross-head mounted to move therein, means for pulling a length of weight material from a source of supply, a releasable clamp carried by the cross-head for clamping it to the weight material so as to be moved thereby, a straight edge secured to the cross-head, a pivoted arm, an adjustable device on the arm which engages the straight edge, a means for causing the arm and device to follow the movements of the straight edge, and a knife for cutting off a length of weight material after it has passed beyond the pulling means.

6. In a machine of the character described, the combination of a frame, a cross-head mounted to move therein, means for pulling a length of weight material from a source of supply, a releasable clamp carried by the cross-head for clamping it to the weight material so as to be moved thereby, a pivoted arm, the angular movement of which is governed by the movements of the cross-head and of the weight material, spring means for causing the arm to move in an arc the length of which is governed by the movement of the cross-head, and a knife for cutting a length of weight material as determined by the movement of the cross-head.

7. In a machine of the character described, the combination of a frame, a cross-head mounted to move therein, means for pulling a length of weight material from a source of supply, a releasable clamp carried by the cross-head for clamping it to the weight material so as to be moved thereby, a pivoted arm, the angular movement of which is governed by the movements of the cross-head and of the weight material, a knife for cutting off a length of weight material after it has passed through the pulling means, and a means for simultaneously actuating the knife and opening the clamp which latter permits the cross-head to move to its initial position.

8. In a machine of the character described, the combination of a supporting frame, means carried by the frame for pulling a length of weight material through it, a measuring means mounted on the frame and moved by the weight material, an indicator means which causes the indicator to follow movements of the measuring means, a releasable clamp for securing the measuring means to that portion of the weight material located within the frame, a knife for cutting off a length of weight material after it has passed through the pulling means, a device common to the clamp and knife for actuating them to release the measuring device and cut the weight material, and means for restoring the measuring means and the indicator to their initial position.

9. In a machine of the character described, the combination of a supporting frame, means carried by the frame for pulling a length of weight material through it, a measuring means mounted on the frame and moved by the weight material, an indicator, an arm which follows the movements of the measuring means, a pivot on which the indicator and arm are mounted, a spring for turning the pivot, a releasable clamp for securing the measuring means to the weight material, a knife for cutting off a length of weight material after it has passed through the pulling means, an auxiliary spring, which also acts on the pivot to turn it, and an actuator which releases the clamp, moves the knife to cut the material and increases the tension on the auxiliary spring.

10. In a machine of the character described, the combination of a frame, a means carried thereby for pulling a length of weight material through the frame, a measuring means which is releasably connected to the weight material and moves with it, a pivotally supported element, the free end of which follows the movements of the measuring means, the cosine of the angular movement of the element being proportioned to the movement of the measuring means, a means causing the element to follow the movements of the measuring means, and a knife for cutting off a length of weight material after it has passed through the pulling means.

11. In a machine of the character described, the combination of a frame, a cross-head, guides for the cross-head carried by the frame, weight material which passes through the cross-head, a releasable clamp carried by the cross-head for securing it to said material, a pulling means for the weight material, a pivotally supported pointer and a pivotally supported arm which move as a unit and by an angular amount governed by the movement of the cross-head, a means for opening the clamp to release the cross-head, a cushion means to absorb the shock caused by the cross-head on its return movement, and a knife for cutting off that portion of the weight material which extends beyond the pulling means.

12. In a machine of the character described, the combination of a frame, a means permanently engaging the weight material for positively pulling a length thereof through the machine from a source of supply and then ejecting it, a scale plate, a pointer moving over the scale plate to indicate by its position a measure of the length of weight material which has passed through and beyond the pulling means, a means responsive to a movement of the material for moving the pointer, a knife carried by the frame for cutting off said length at a point beyond the pulling means, and means for restoring the pointer to its initial position after each cutting operation.

13. In a machine of the character described, the combination of a frame, a means having a fixed position on the frame for positively moving a length of weight material from a source of supply, said means being in constant clamping engagement with the material, a member carried by the frame and arranged to move with the weight material, an element pivotally supported on the frame, the angular position of which affords an indication of the amount of weight material delivered by the means, actuating means for moving the element angularly about its pivot by an amount determined by the travel of the member, and means for restoring the element to its initial position.

In witness whereof, I have hereto set my hand this 25th day of August, 1930.

ERNEST L. THEARLE.